United States Patent
Ding

(10) Patent No.: US 11,702,364 B2
(45) Date of Patent: *Jul. 18, 2023

(54) ARTIFICIAL STONE SLAB AND METHODS FOR MANUFACTURING THEREOF

(71) Applicant: Guoxing Ding, Foshan (CN)

(72) Inventor: Guoxing Ding, Foshan (CN)

(73) Assignee: Guoxing Ding, Foshan (CN)

( * ) Notice: Subject to any disclaimer, the term of this patent is extended or adjusted under 35 U.S.C. 154(b) by 570 days.

This patent is subject to a terminal disclaimer.

(21) Appl. No.: 16/708,431

(22) Filed: Dec. 9, 2019

(65) Prior Publication Data

US 2021/0122678 A1    Apr. 29, 2021

(30) Foreign Application Priority Data

Oct. 25, 2019    (CN) .......................... 201911025752.2

(51) Int. Cl.

| | | |
|---|---|---|
| *C04B 26/18* | (2006.01) | |
| *C04B 24/42* | (2006.01) | |
| *C04B 22/06* | (2006.01) | |
| *C04B 14/06* | (2006.01) | |
| *C04B 40/00* | (2006.01) | |
| *B28B 3/02* | (2006.01) | |

(52) U.S. Cl.
CPC .............. *C04B 26/18* (2013.01); *C04B 14/06* (2013.01); *C04B 22/06* (2013.01); *C04B 22/064* (2013.01); *C04B 22/066* (2013.01); *C04B 24/42* (2013.01); *C04B 40/0046* (2013.01); *C04B 40/0071* (2013.01); *C04B 40/0082* (2013.01); *B28B 3/02* (2013.01)

(58) Field of Classification Search
CPC ....... C04B 14/06; C04B 14/30; C04B 14/303; C04B 14/304; C04B 14/308; C04B 22/06; C04B 22/064; C04B 22/066; C04B 22/068; C04B 24/42; C04B 26/06; C04B 26/18; C04B 40/0028; C04B 40/0046; C04B 40/0071; C04B 40/0082; C04B 40/0259; C04B 40/0263; C04B 2103/54; B28B 1/005; B28B 3/02; B29C 67/243
See application file for complete search history.

(56) References Cited

U.S. PATENT DOCUMENTS 11,124,453 B2 * 9/2021 Li ........................... C04B 14/06
11,167,578 B2 * 11/2021 Ding ..................... B41M 5/007

FOREIGN PATENT DOCUMENTS

| CN | 104628301 A | * | 5/2015 |
| CN | 104671705 A | * | 6/2015 |
| CN | 109369068 A | * | 2/2019 |

* cited by examiner

*Primary Examiner* — Anthony J Green
(74) *Attorney, Agent, or Firm* — Sheppard, Mullin, Richter & Hampton LLP

(57) ABSTRACT

The present invention discloses an artificial stone slab, wherein the raw materials are mixed, pressed, and solidified, and the raw material comprises a main material and an auxiliary material. The main material, according to the total weight ratio of raw materials, comprises from about 20% to about 85% of particles containing hydroxide or metal oxide, from about 0% to about 50% of natural quartz, and from about 5% to about 25% of resin. The auxiliary material comprises a coupling agent and a curing agent, wherein the weight ratio of the coupling agent to the resin is from about 0.6:100 to about 2:100, and the weight ratio of the curing agent to the resin is from about 0.8:100 to about 1.2:100. The present invention also provides methods for manufacturing the aforesaid artificial stone slab. The present invention replaces natural quartz particles with particles containing hydroxide or metal oxide and ensures that the performance of the slab is up to standard, that the quality is more stable and easier to control, the decorative results are better, and finally, the mining of natural quartz is reduced by 10 times, achieving the objectives of greater environmental protection and lower costs. The resulting slab provides stable performance with good decorative results and thus saves resources and is conducive to environmental protection.

18 Claims, No Drawings

ARTIFICIAL STONE SLAB AND METHODS FOR MANUFACTURING THEREOF

CROSS-REFERENCE TO PRIOR APPLICATION

This application claims the benefit of foreign priority under 35 U.S.C. § 1.119 to Chinese Patent Application No. CN 201911025752.2, filed Oct. 25, 2019, which is incorporated by reference herein in its entirety.

FIELD

The present invention belongs to the field of artificial stone technology, in particular to an artificial stone slab and methods of manufacture thereof.

BACKGROUND

At present, the demand for stone as a building and decorative material is increasing. For instance, natural marble, quartz stone, and granite are made into cabinets, conference tables, and tabletops. However, due to limited resources, high costs, and difficulty in mining, natural stone is likely to cause a certain degree of damage to the environment. Therefore, artificial stone manufacturing technology with lower costs has become increasingly mature. Artificial stone is usually a stirred and mixed material, more than 80% of which is natural quartz, a resin binder, curing agent, colorants, and other additives which is then pressed into a slab shape, baked, cured, and polished.

At present, natural quartz particles are the main filler components in artificial quartz stone. The yield and quality of natural quartz are affected by mineral resources, and its impurities, whiteness, and permeability have a great impact on slab manufacturing. Although its own hardness can improve slab hardness, the quality of quartz sand/powder is very unstable due to the influence of the quartz ore source, and the difference in whiteness and impurities is large.

SUMMARY

In view of the aforesaid drawbacks, the purpose of the present invention is to provide an artificial stone slab and methods of manufacture thereof, which replaces natural quartz particles with one or more of a metal oxide or a hydroxide as a reinforcing particle filler. It guarantees the performance of the slab, and the quality is more stable and easier to control. The decorative effect is better, and ultimately, the mining of natural quartz is reduced, which has the advantages of environmental protection and low costs.

To solve the aforesaid problems, the present invention provides an artificial stone slab, formed by mixing, pressing, and solidifying raw materials comprising a main material and an auxiliary material, the main material the main material comprising from about 20% to about 85% of particles containing hydroxide or metal oxide, from about 0% to about 50% of natural quartz, and from about 5% to about 25% of resin and the auxiliary material comprising a coupling agent and a curing agent, wherein the weight ratio of the coupling agent to the resin is from about 0.6:100 to about 2:100 and the weight ratio of the curing agent to the resin is from about 0.8:100 to about 1.2:100.

In a preferred embodiment, the metal oxide or hydroxide particles account for 4 from about 0% to about 50% of the weight ratio of the main material and natural quartz accounts for from about 30% to about 50% by weight of the main material.

In a preferred embodiment, the particles containing hydroxide or metal oxide comprise one or more of aluminum hydroxide, barium hydroxide, calcium hydroxide, magnesium hydroxide, aluminum oxide, magnesium oxide, iron oxide, calcium oxide, or barium oxide.

In a preferred embodiment, the resin is an unsaturated polyester resin and is selected from one or more of a polyester resin, a composite acrylic resin, or a vinyl resin, the coupling agent is a silane coupling agent, and the curing agent is a peroxide or a mixture of a plurality of peroxides.

In a preferred embodiment, the coupling agent is one or more of methacryloxy propyl trimethoxyl silane, γ-(2,3-epoxypropoxy) propyl trimethoxysilane, N-(β-aminoethyl)-γ-aminopropyl methyl dimethoxy silane, vinyltriethoxysilane, vinyltrimethoxysilane, or γ-aniline-methyltriethoxysilane and wherein the curing agent is one or more of tert-Butyl peroxy-2-ethylhexanoate, methyl ethyl ketone peroxide, tert-Butyl perbenzoate, cyclohexanone peroxide, or benzoyl peroxide.

In a preferred embodiment, the raw material further comprises a colored pigment; the color pigment is one or more of an inorganic pigment, an organic pigment or a color paste and wherein the color pigment accounts for from about 0% to about 1.5% of the total weight of the raw materials.

To solve the aforesaid problems, the present invention provides a method for manufacturing the aforesaid artificial stone slab, which comprises the following steps:

1) adding resin and color pigment to a mixing tank according to the weight ratio, and stirring through a dispersing machine to obtain a color paste;
2) adding the coupling agent and the curing agent to the mixing tank in proportion and stirring and mixing the color paste through the dispersing machine to form a color paste mixture;
3) respectively adding particles containing metal oxide or hydroxide and natural quartz to an agitator and adding the aforesaid color paste mixture to the agitator and mixing with the particles containing metal oxide or hydroxide and natural quartz to obtain a mixed prefabricated material;
4) placing the aforesaid mixed prefabricated material in a mold frame, pressing to form a prefabricated slab, and placing the prefabricated slab in a baking oven for curing to obtain the artificial stone slab.

In a preferred embodiment, the stirring and mixing time in step 1) is 30-120 minutes and the stirring and mixing in step 2) is from about 2 minutes to about 3 minutes.

In a preferred embodiment, wherein the agitator in step 3) is a planetary mixer, wherein the revolution frequency of the mixer is from about 5 Hz to about 50 Hz, wherein the rotation frequency of the mixer is from about 10 Hz to about 50 Hz, and the total time of stirring and mixing is from about 5 minutes to about 12 minutes.

In a preferred embodiment, the temperature at which the prefabricated slab is cured in the step 4) is from about 75° C. to about 110° C., and the time is from about 70 minutes to about 180 minutes.

Compared with the prior art, the present invention has the beneficial effect that the present invention replaces part or all of the natural quartz particles with particles containing metal oxides or hydroxides and ensures that the performance of the slab is up to standard, that the quality is more stable and easier to control, the decorative results are better, and finally, the mining of natural quartz is reduced, achieving the objectives of greater environmental protection and lower costs. The resulting slab provides stable performance with good decorative results and thus saves resources and is conducive to environmental protection.

DETAILED DESCRIPTION OF THE PREFERRED EMBODIMENTS

The technical solution of the present invention will be further explained below through preferred embodiments.

The present invention provides an artificial stone slab, formed by mixing, pressing, and solidifying raw materials comprising a main material and an auxiliary material, the main material the main material comprising from about 20% to about 85% of particles containing hydroxide or metal oxide, from about 0% to about 50% of natural quartz, and from about 5% to about 25% of resin and the auxiliary material comprising a coupling agent and a curing agent, wherein the weight ratio of the coupling agent to the resin is from about 0.6:100 to about 2:100 and the weight ratio of the curing agent to the resin is from about 0.8:100 to about 1.2:100. That is, the particles containing metal oxides or hydroxides account for from about 20% to about 85% of the total weight of the raw materials; natural quartz accounts for from about 0% to about 50% of the total weight of the raw materials; the resin accounts for from about 5% to about 25% of the total weight of the raw materials.

Specifically, the metal oxide or hydroxide particles more preferably comprise from 40% to 50% by weight of the total weight of the raw material, for example, 45%. The metal oxide or hydroxide containing particles have a crystal structure. And including particle size specifications of 100-200 mesh and 325-400 mesh, its impurity, permeability, whiteness, and other quality properties are more stable than natural quartz, the cost is lower, and the decorative results are better, such that environmental protection and cost savings can be achieved.

The particles containing hydroxide or metal oxide comprise one or more of aluminum hydroxide, barium hydroxide, calcium hydroxide, magnesium hydroxide, aluminum oxide, magnesium oxide, iron oxide, calcium oxide, or barium oxide; wherein, Wherein the aluminum hydroxide, barium hydroxide, calcium hydroxide, magnesium hydroxide, aluminum oxide, magnesium oxide, iron oxide, calcium oxide or barium oxide respectively account for from about 0% to about 100% of the weight of the particles containing metal oxide or hydroxide. In other words, when the main material contains particles of hydroxide, and the hydroxide is one or more of the one or more of aluminum hydroxide, barium hydroxide, calcium hydroxide, and magnesium hydroxide, if there is only one of them, the hydroxide accounts for 100% of the weight of the particles, and if there are two or more, the ratio of each can be from about 0% to about 100%. When the main material contains particles of metal oxide, and the metal oxide is one or more of the one or more of the aluminum oxide, magnesium oxide, iron oxide, calcium oxide, or barium oxide, if there is only one of them, the metal oxide accounts for 100% of the weight of the particles, and if there are two or more, the ratio of each can be from about 0% to about 100%.

The natural quartz is quartz sand or quartz powder, which is a crystal structure, which is formed by crushing and sieving natural quartz ore, and the main component is $SiO_2$. When the natural quartz accounts for 0% of the total weight of the raw materials, that is, the main material does not contain natural quartz at this time, and at this time, the main materials all use particles containing hydroxide or metal oxide, wherein the artificial stone slab can also achieve the corresponding hardness, whiteness, permeability, and other effects and the hardness and brightness are slightly worse than those of natural quartz. The natural quartz more preferably accounts for from about 30% to about 50% of the total weight of the raw materials, for example, 40%; the mesh size ranges from 4-6, 6-8, 8-16, 16-26, 26-40, 40-70 70-120, 325/400 mesh; thus, the artificial stone produced can also achieve better hardness, whiteness, permeability, and the like.

Specifically, the resin accounts for 5% to 25% by weight of the total amount of the raw material, for example, 12%. The resin is an unsaturated polyester resin and is selected from one or more of a polyester resin, a composite acrylic resin, or a vinyl resin, the coupling agent is a silane coupling agent, and the curing agent is a peroxide or a mixture of a plurality of peroxides. Preferably, the coupling agent is one or more of methacryloxy propyl trimethoxyl silane, γ-(2,3-epoxypropoxy) propyl trimethoxysilane, N-(β-aminoethyl)-γ-aminopropyl methyl dimethoxy silane, vinyltriethoxysilane, vinyltrimethoxysilane, or γ-aniline-methyl-triethoxysilane; the curing agent is one or more of tert-Butyl peroxy-2-ethylhexanoate, methyl ethyl ketone peroxide, tert-Butyl perbenzoate, cyclohexanone peroxide, or benzoyl peroxide.

Further, the raw material further comprises a colored pigment; the color pigment is one or more of an inorganic pigment, an organic pigment or a color paste and wherein the color pigment accounts for from about 0% to about 1.5% of the total weight of the raw materials.

The present invention further provides a method for manufacturing the aforesaid artificial stone slab, which comprises the following steps:
1) adding resin and color pigment to a mixing tank according to the weight ratio, and stirring through a dispersing machine to obtain a color paste;
2) adding the coupling agent and the curing agent to the mixing tank in proportion and stirring and mixing the color paste through the dispersing machine to form a color paste mixture;
3) respectively adding particles containing metal oxide or hydroxide and natural quartz to an agitator and adding the aforesaid color paste mixture to the agitator and mixing with the particles containing metal oxide or hydroxide and natural quartz to obtain a mixed prefabricated material;
4) placing the aforesaid mixed prefabricated material in a mold frame, pressing to form a prefabricated slab, and placing the prefabricated slab in a baking oven for curing to obtain the artificial stone slab.

Specifically, the stirring and mixing time in step 1) is from about 30 to about 120 minutes and the dispersing machine is a hydraulic lifting disperser, and the dispersing machine speed is from about 0 rpm to about 1,500 rpm. Stirring and mixing in step 2) is from about 2 minutes to about 3 minutes, the dispersing machine is a hydraulic lifting disperser, and the dispersing machine speed is from about 0 rpm to about 1,500 rpm. The agitator in step 3) is a planetary mixer, wherein the revolution frequency of the mixer is from about 5 Hz to about 50 Hz, wherein the rotation frequency of the mixer is from about 10 Hz to about 50 Hz, and the total time of stirring and mixing is from about 5 minutes to about 12 minutes. The temperature at which the prefabricated slab is cured in the step 4) is from about 75° C. to about 110° C., and the time is from about 70 minutes to about 180 minutes.

Embodiment 1

By weight, 4.7 kg (1% of the total weight of the raw materials) of the color pigment is added to 70.5 kg of unsaturated polyester resin (15% of the total amount of the raw materials) and dispersed by a dispersing machine. The stirring and dispersing time is 60 minutes, the speed is 800 rpm, and a color paste is made.

705 g of a silane coupling agent (1.0:100 by weight of the resin) and 634.5 g of a curing agent (0.9:100 by weight of the resin) are added to a mixing tank and are uniformly stirred and mixed in the color paste to form a color paste mixture; wherein, the dispersing machine used stirs for two minutes at a speed of 800 rpm.

By weight, 211.5 kg of particles containing barium hydroxide (45% by total weight of the raw materials), 188 kg (40% by total weight of the raw materials) of natural quartz are added to an agitator, and 75.2 kg of color paste (16% by total weight of the raw materials) is added to the agitator.

The aforesaid barium hydroxide particles and color paste mixture are mixed uniformly in the agitator to obtain a mixed prefabricated material; wherein, the total stirring and mixing time is 7 minutes; the agitator is a planetary mixer, the revolution frequency is 30 Hz, and the rotation frequency is 30 Hz.

The aforesaid mixed prefabricated material is placed in a mold frame, pressed to form a prefabricated slab, and the prefabricated slab is placed in a baking oven and cured at 90° C. for 100 minutes to obtain an artificial stone slab.

The artificial stone slab obtained in the present embodiment has good fluidity and compatibility after mixing in the preparation process. It fully meets the performance of the natural quartz-based slab material in the prior art, does not crack easily, resists scratching, and has good compactness and good decorative results.

Embodiment 2

By weight, 4.57 kg (1.2% of the total weight of the raw materials) of the color pigment is added to 49.51 kg of unsaturated polyester resin (13% of the total amount of the raw materials) and dispersed by a dispersing machine. The stirring and dispersing time is 50 minutes, the speed is 900 rpm, and a color paste is made.

594 g of a silane coupling agent (1.2:100 by weight of the resin) and 495 g of a curing agent (1:100 by weight of the resin) are added to a mixing tank and are uniformly stirred and mixed in the unsaturated polyester resin to form a resin mixture; wherein, the stirring time is three minutes.

By weight, 179 kg of particles containing magnesium oxide (47% by total weight of the raw materials), 152 kg (40% by total weight of the raw materials) of natural quartz are added to an agitator, and 54.08 kg of color paste (14.2% by total weight of the raw materials) is added to the agitator.

The aforesaid magnesium oxide particles and color paste are mixed uniformly in the agitator to obtain a mixed prefabricated material; wherein, the total stirring and mixing time is 9 minutes; the agitator is a planetary mixer, the revolution frequency is 40 Hz, and the rotation frequency is 40 Hz.

The aforesaid mixed prefabricated material is placed in a mold frame, pressed to form a prefabricated slab, and the prefabricated slab is placed in a baking oven and cured at from about 75° C. to about 110° C. for 90 minutes to obtain an artificial stone slab.

The artificial stone slab obtained in the present embodiment has good fluidity and compatibility after mixing in the preparation process. It fully meets the performance of the natural quartz-based slab material in the prior art, does not crack easily, resists scratching, and has good compactness and good decorative results.

Embodiment 3

By weight, 3.6 kg (0.8% of the total weight of the raw materials) of the color pigment is added to 45 kg of unsaturated polyester resin (10% of the total amount of the raw materials) and dispersed by a dispersing machine. The stirring and dispersing time is 80 minutes, the speed is 1100 rpm, and a color paste is made.

810 g of a silane coupling agent (1.8:100 by weight of the resin) and 405 g of a curing agent (0.9:100 by weight of the resin) are added to a mixing tank and are uniformly stirred and mixed in the unsaturated polyester resin to form a resin mixture; wherein, the stirring time is three minutes.

By weight, 225 kg of particles containing aluminum hydroxide (50% by total weight of the raw materials), 148.5 kg (33% by total weight of the raw materials) of natural quartz are added to an agitator, and 48.6 kg of color paste (10.8% by total weight of the raw materials) is added to the agitator.

The aforesaid aluminum hydroxide particles and color paste mixture are mixed uniformly in the agitator to obtain a mixed prefabricated material; wherein, the total stirring and mixing time is 12 minutes; the agitator is a planetary mixer, the revolution frequency is 25 Hz, and the rotation frequency is 45 Hz.

The aforesaid mixed prefabricated material is placed in a mold frame, pressed to form a prefabricated slab, and the prefabricated slab is placed in a baking oven and cured at 110° C. for 130 minutes to obtain an artificial stone slab.

The artificial stone slab obtained in the present embodiment has good fluidity and compatibility after mixing in the preparation process. It fully meets the performance of the natural quartz-based slab material in the prior art, does not crack easily, resists scratching, and has good compactness and good decorative results.

The above descriptions are only preferred embodiments of the present invention and are a further detailed description of the present invention in conjunction with specific preferred embodiments This is not to be construed that the specific implementation of the present invention is limited to these descriptions. Any modifications, equivalent, substitutions, and improvements made within the spirit and principles shall be covered by the scope of the present invention.

The invention claimed is:

1. An artificial stone slab prepared by mixing, pressing, and solidifying a raw material, wherein the raw material comprises:
   (a) a main material, and
   (b) an auxiliary material,
   wherein the main material comprises:
      (i) particles containing a hydroxide or a metal oxide, wherein the metal oxide or the hydroxide particles comprise from about 40% to about 50% by weight of the main material,
      (ii) a natural quartz, wherein the natural quartz comprises about 30% to about 50% by weight of the main material, and
      (iii) from about 5% to about 25% of a resin and
   wherein the auxiliary material comprises:
      (i) a coupling agent and
      (ii) a curing agent,
      wherein the weight ratio of the coupling agent to the resin is from about 0.6:100 to about 2:100 and the weight ratio of the curing agent to the resin is from about 0.8:100 to about 1.2:100;
wherein the resin is an unsaturated polyester resin and is selected from the group consisting of one or more of a polyester resin, a composite acrylic resin, and a vinyl resin,
wherein the coupling agent is a silane coupling agent, and
wherein the curing agent is a peroxide or a mixture of a plurality of peroxides.

2. The artificial stone slab according to claim 1, wherein the particles containing hydroxide or metal oxide comprise one or more ingredients selected from the group consisting of aluminum hydroxide, barium hydroxide, calcium hydroxide, magnesium hydroxide, aluminum oxide, magnesium oxide, iron oxide, calcium oxide, barium oxide, and combinations thereof.

3. The artificial stone slab according to claim 1,
wherein the coupling agent is one or more agents selected from the group consisting of methacryloxy propyl trimethoxyl silane, γ-(2, 3-epoxypropoxy) propyl trimethoxysilane, N-(β-aminoethyl)-γ-aminopropyl methyl dimethoxy silane, vinyltriethoxysilane, vinyltrimethoxysilane, γ-aniline-methyl-triethoxysilane, and combinations thereof and
wherein the curing agent is one or more agents selected from the group consisting of tert-Butyl peroxy-2-ethylhexanoate, methyl ethyl ketone peroxide, tert-Butyl perbenzoate, cyclohexanone peroxide, benzoyl peroxide, and combinations thereof.

4. The artificial stone slab according to claim 1,
wherein the raw material further comprises a color pigment; the color pigment is one or more pigments selected from the group consisting of an inorganic pigment, an organic pigment, a color paste, and combinations thereof and
wherein the color pigment accounts for from about 0% to about 1.5% of the total weight of the raw materials.

5. A method of manufacturing the artificial stone slab of claim 1, the method comprising the steps of:
1) adding the resin and a color pigment to a mixing tank in an appropriate weight ratio, and stirring and mixing through a dispersing machine to obtain a color paste;
2) adding the coupling agent and the curing agent to the mixing tank in an appropriate proportion and stirring and mixing the color paste through the dispersing machine to form a color paste mixture;
3) respectively adding to an agitator
particles containing metal oxide or hydroxide and natural quartz, and the color paste mixture;
4) mixing the color paste mixture with the particles containing metal oxide or hydroxide and natural quartz to obtain a mixed prefabricated material;
5) placing the aforesaid mixed prefabricated material in a mold frame, pressing to form a prefabricated slab, and placing the prefabricated slab in a baking oven, curing the prefabricated slab to obtain the artificial stone slab.

6. A method for manufacturing the artificial stone slab according to claim 5, wherein the stirring and mixing time in step 1) is from about 30 minutes to about 120 minutes and the stirring and mixing in step 2) is from about 2 minutes to about 3 minutes.

7. A method of manufacturing the artificial stone slab according to claim 5, wherein the agitator in step 3) is a planetary mixer, wherein the revolution frequency of the mixer is from about 5 Hz to about 50 Hz, wherein the rotation frequency of the mixer is from about 10 Hz to about 50 Hz, and the total time of stirring and mixing is from about 5 minutes to about 12 minutes.

8. A method of manufacturing the artificial stone slab according to claim 5, wherein the temperature at which the prefabricated slab is cured in the step 5) is from about 75° C. to about 110° C., and the time is about 70 minutes to about 180 minutes.

9. A method of manufacturing the artificial stone slab of claim 3, the method comprising the steps of:
1) adding the resin and the color pigment to a mixing tank in an appropriate weight ratio, and stirring through a dispersing machine to obtain a color paste;
2) adding the coupling agent and the curing agent to the mixing tank in an appropriate proportion and stirring and mixing the color paste through the dispersing machine to form a color paste mixture;
3) respectively adding to an agitator
particles containing metal oxide or hydroxide and natural quartz, and the color paste mixture;
4) mixing the color paste mixture with the particles containing metal oxide or hydroxide and natural quartz to obtain a mixed prefabricated material;
5) Placing the aforesaid mixed prefabricated material in a mold frame, pressing to form a prefabricated slab, and placing the prefabricated slab in a baking oven, curing the prefabricated slab to obtain the artificial stone slab.

10. A method of manufacturing the artificial stone slab according to claim 9, wherein the stirring and mixing time in step 1) is from about 30 minutes to about 120 minutes and the stirring and mixing in step 2) is from about 2 minutes to about 3 minutes.

11. A method of manufacturing the artificial stone slab according to claim 9, wherein the agitator in step 3) is a planetary mixer, wherein the revolution frequency of the mixer is from about 5 Hz to about 50 Hz, wherein the rotation frequency of the mixer is from about 10 Hz to about 50 Hz, and the total time of stirring and mixing is from about 5 minutes to about 12 minutes.

12. A method of manufacturing the artificial stone slab according to claim 9, wherein the temperature at which the prefabricated slab is cured in the step 5) is from about 75° C. to about 110° C., and the time is about 70 minutes to about 180 minutes.

13. A method of manufacturing the artificial stone slab of claim 4, the method comprising the steps of:
1) Adding the resin and the color pigment to a mixing tank in an appropriate weight ratio, and stirring through a dispersing machine to obtain a color paste;
2) adding the coupling agent and the curing agent to the mixing tank in an appropriate proportion and stirring and mixing the color paste through the dispersing machine to form a color paste mixture;
3) Respectively adding to an agitator
particles containing metal oxide or hydroxide and natural quartz, and the color paste mixture;
4) mixing the color paste mixture with the particles containing metal oxide or hydroxide and natural quartz to obtain a mixed prefabricated material;
5) Placing the aforesaid mixed prefabricated material in a mold frame, pressing to form a prefabricated slab, and placing the prefabricated slab in a baking oven, curing the prefabricated slab to obtain the artificial stone slab.

14. A method of manufacturing the artificial stone slab according to claim 13, wherein the stirring and mixing time in step 1) is from about 30 minutes to about 120 minutes and the stirring and mixing in step 2) is from about 2 minutes to about 3 minutes.

15. A method of manufacturing the artificial stone slab according to claim 13, wherein the agitator in step 3) is a planetary mixer, wherein the revolution frequency of the mixer is from about 5 Hz to about 50 Hz, wherein the rotation frequency of the mixer is from about 10 Hz to about 50 Hz, and the total time of stirring and mixing is from about 5 minutes to about 12 minutes.

16. A method of manufacturing the artificial stone slab according to claim 13, wherein the temperature at which the prefabricated slab is cured in step 5) is from about 75° C. to about 110° C., and the time is about 70 minutes to about 180 minutes.

17. A method of manufacturing the artificial stone slab of claim 2, the method comprising the steps of:
  1) Adding the resin and a color pigment to a mixing tank in an appropriate weight ratio, and stirring through a dispersing machine to obtain a color paste;
  2) adding the coupling agent and the curing agent to the mixing tank in an appropriate proportion and stirring and mixing the color paste through the dispersing machine to form a color paste mixture;
  3) Respectively adding to an agitator
    particles containing metal oxide or hydroxide and natural quartz, and the color paste mixture;
  4) mixing the color paste mixture with the particles containing metal oxide or hydroxide and natural quartz to obtain a mixed prefabricated material;
  5) Placing the aforesaid mixed prefabricated material in a mold frame, pressing to form a prefabricated slab, and placing the prefabricated slab in a baking oven, curing the prefabricated slab to obtain the artificial stone slab.

18. A method of manufacturing the artificial stone slab of claim 3, comprising the steps of:
  1) adding the resin and a color pigment to a mixing tank in an appropriate weight ratio, and stirring through a dispersing machine to obtain a color paste;
  2) adding the coupling agent and the curing agent to the mixing tank in an appropriate proportion and stirring and mixing the color paste through the dispersing machine to form a color paste mixture;
  3) respectively adding to an agitator
    particles containing metal oxide or hydroxide and natural quartz, and the color paste mixture;
  4) mixing the color paste mixture with the particles containing metal oxide or hydroxide and natural quartz to obtain a mixed prefabricated material;
  5) placing the aforesaid mixed prefabricated material in a mold frame, pressing to form a prefabricated slab, and placing the prefabricated slab in a baking oven, curing the prefabricated slab to obtain the artificial stone slab.

* * * * *